United States Patent [19]

Nguyen et al.

[11] Patent Number: 5,716,441
[45] Date of Patent: Feb. 10, 1998

[54] STARCH-BASED, WATER RESISTANT ADHESIVES

[75] Inventors: Nina Nguyen, Somerset; Daniel B. Solarek, Belle Mead; Joseph Wieczorek, Jr., Flemington; Charles W. Cline, Stockton; Jeffrey Atkinson, Neshanic Station, all of N.J.

[73] Assignee: National Starch and Chemical Investment Holding Corporation, Wilmington, Del.

[21] Appl. No.: 722,786

[22] Filed: Sep. 27, 1996

[51] Int. Cl.⁶ .................................. C09J 103/06
[52] U.S. Cl. ..................................... 106/207.1
[58] Field of Search ........................... 106/207.1

[56] References Cited

U.S. PATENT DOCUMENTS

| | | | |
|---|---|---|---|
| 2,661,349 | 12/1953 | Caldwell et al. | 260/224 |
| 3,655,644 | 4/1972 | Durand | 106/207.1 |
| 3,844,807 | 10/1974 | Bramel | 106/213 |
| 4,231,803 | 11/1980 | Bovier et al. | 106/207.1 |
| 4,780,339 | 10/1988 | Lacourse et al. | 427/389.7 |
| 4,838,944 | 6/1989 | Kruger | 127/71 |
| 5,153,161 | 10/1992 | Kerschner et al. | 502/167 |

FOREIGN PATENT DOCUMENTS

| | | | |
|---|---|---|---|
| 54-132634 | 10/1979 | Japan | C09J 3/06 |
| 1 469 178 | 3/1977 | United Kingdom | C08L 3/02 |

OTHER PUBLICATIONS

O.B. Wurzburg, "Modified Starches: Properties and Uses", 1986, no month avail. Chapter 9, 131–147.

R.L. Whistler et al., "Starch: Chemistry and Technology", Second Edition, 1984, no month avail. pp. 341–349.

R.L. Whistler et al., "Starch: Chemistry and Technology", Second Edition, 1984, no month avail. pp. 599–610.

*Primary Examiner*—David Brunsman
*Attorney, Agent, or Firm*—Eugene Zagarella, Jr.

[57] ABSTRACT

An aqueous water resistant, viscosity stable adhesive composition for use in paper bonding applications comprising a hydrophobically modified fluidity corn starch having a water fluidity of about 60 to 80 and a solids content of about 8 to 40%. The starch having the formula

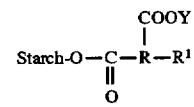

wherein R is a dimethylene or trimethylene group, R' is a hydrocarbon group having 5–12 carbon atoms and Y is H, alkali metal, alkaline earth metal or ammonium.

24 Claims, No Drawings

STARCH-BASED, WATER RESISTANT ADHESIVES

BACKGROUND OF THE INVENTION

This invention relates to starch-based adhesives which are water resistant without containing urea-formaldehyde or other chemical crosslinkers and which further have desired viscosity stability characteristics.

Starches have been used for some time in various adhesive applications especially for paper products such as bags, tubes and tissue towels. This is illustrated in "Starch: Chemistry and Technology", second edition, edited by R. L. Whistler et al., 1984, Chapter XX, pp. 599–609, where the use of starch and dextrins in prepared adhesives including bag adhesives, laminating, tube winding and case and carton sealing is shown.

While many starch products have been successfully used in different adhesive formulations, when applications require water resistance, modification to the formulation is usually needed because a starch bond is normally not water resistant. Consequently, in order to provide starch based adhesive formulations which provide water resistance, additives such as urea-formaldehyde, resorcinol-formaldehyde and other thermosetting resin and crosslinking agents are typically used as further indicated in the Whistler et al. article noted above, at page 601. The use of a urea-formaldehyde reaction product to provide water resistance in an alkali digested starch adhesive formulation is described in British Patent No. 1,469,178 and Japanese Patent No. 132,634/79 discloses an epichlorohydrin-crosslinked hydroxyethyl starch-based paper bag adhesive. U.S. Pat. No. 3,844,807 discloses water resistant starch-based paper bag adhesives comprising a pre-blend mix of acid hydrolyzed starch, hydroxyethylated starch, a specific starch modifier—polyoxyethylene laminate and urea formaldehyde resin.

Despite the acknowledged use and availability of starch-based, water resistant adhesive products as described above, the ability to provide such a product without added formaldehyde or other chemical crosslinking agents has been and still is a desired goal, particularly one that also provides suitable viscosity stability.

SUMMARY OF THE INVENTION

It has now been found that a starch-based water resistant adhesive composition free of formaldehyde and other crosslinking additives is provided by the use of a selected hydrophobically modified, fluidity corn starch.

More particularly, this invention is directed to a water resistant, viscosity stable adhesive composition comprising a hydrophobically modified fluidity corn starch having the formula:

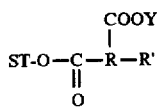

where ST is a fluidity corn starch having a water fluidity (WF) of from about 60 to 80; R is a dimethylene or trimethylene group, R' is a hydrocarbon group having 5 to 12, and preferably 8, carbon atoms; and Y is H, alkali metal, alkaline earth metal or ammonium.

DETAILED DESCRIPTION OF THE INVENTION

The water resistant adhesive composition of this invention comprises a hydrophobically modified fluidity corn starch which is prepared by reacting the base corn starch with an organic acid anhydride reagent material having the following structural formula:

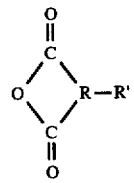

where R represents a dimethylene or trimethylene group and R' is a substituent hydrocarbon group having 5 to 12, and preferably 8, carbon atoms. The hydrocarbon or hydrophobic substituent group R' may be alkyl, aryl, alkenyl, aralkyl or aralkenyl with alkyl and alkenyl being preferred. Particularly preferred for R' is an octenyl group. Starch derivatives of this type are known and have been prepared using a standard esterification reaction where the reagent and starch suspended in water are mixed under alkaline conditions as disclosed in U.S. Pat. No. 2,661,349 issued on Dec. 1, 1953 to C. Caldwell and O. Wurzburg. The starch derivatives and method of preparation are further described in "Starch: Chemistry and Technology", Second Edition, edited by R. L. Whistler et al., 1984, pp. 341–343 and "Modified Starches: Properties and Uses", edited by O. Wurzburg, 1986, Chapter 9, pp. 131–147.

The base starch material used in preparing the hydrophobically modified starch is corn starch which is converted to a water fluidity (WF) of from about 60 to 80, preferably about 66 to 78 and more preferably from about 68 to 75. The measurement for water fluidity as described herein is made using a Thomas Rotational Shear Type Viscometer (manufactured by Arthur H. Thomas Co., Philadelphia, Pa.) in accordance with standard procedures such as disclosed in Zwiercan et al., U.S. Pat. No. 4,499,116 issued Feb. 12, 1985, which patent is incorporated by reference herein. The derivatized corn starch may be converted or degraded to the selected water fluidity using either oxidative hydrolysis or acid hydrolysis. However, in order to get the most suitable viscosity stability it is desirable and preferred to use an oxidation hydrolysis procedure employing hydrogen peroxide and a catalytic amount of manganese ions, such as potassium permanganate, in an alkaline slurry reaction.

The process of oxidation hydrolysis with hydrogen peroxide may be carried out using a starch aqueous slurry ordinarily at 20 to 50% solids and raising the pH to about 11.0 to 12.5 with sodium hydroxide. Temperatures ranging from about 0° to 55° C. can be used to react the starch but a range of about 22° to 45° C. is most practical and preferred in the process with the higher temperatures requiring less time for completion of the reaction. In order to achieve improved reaction rates when using slurry temperatures below room temperature (e.g., 0° to 20° C.), it is preferable that the pH level be maintained at the upper portion of the designated useful pH range (pH 11.8 to 12.5). In order to avoid gelatinization of the starch, the temperature should not be allowed to go much about 50° C.

Potassium permanganate catalyst is used in the hydrogen peroxide hydrolysis described herein, however, other manganese salts such as manganous chloride, manganic acetate, manganous acetate and manganous nitrate as disclosed in U.S. Pat. No. 4,838,944 issued Jun. 13, 1989 to L. Kruger may also be used. Additionally, mangenese complexes such as manganese (N,N',N")-trimethyl 1,4,7-triazocyclononane) hexafluorophosphate as disclosed in U.S. Pat. No. 5,153,161 issued Oct. 6, 1992 to J. Kerschner et al. may also be used.

Sufficient manganese metal salt or complex are added to the slurry with stirring to provide a concentration of about 0.05 to 150 ppm (parts per million) and preferably about 0.1 to 90 ppm of manganese metal ions based on the amount of starch solids. If desired, the catalyst can be added to the slurry prior to pH adjustment.

Hydrogen peroxide is then introduced into the slurry with the full amount added at once or if desired, divided into several portions (5 or 6 or more with larger amounts of peroxide) and added at about one hour intervals or added continuously as when metered in with a pump. The amount of hydrogen peroxide employed is from about 0.0075 to 15%, preferably about 0.01 to 2.0% anhydrous, and more preferably about 0.5 to 1.5% based on starch solids. The reagent is ordinarily introduced by the addition of sufficient 30 to 35% aqueous hydrogen peroxide as is commonly supplied in commerce.

While the oxidation hydrolysis process of this invention has been described employing peroxide together with a manganese catalyst, it will be understood that other compounds which yield hydrogen peroxide on contact with water can be substituted for the required hydrogen peroxide. Such hydrogen peroxide equivalents include alkali metal and alkaline earth metal peroxides such as sodium and potassium peroxide, alkali metal perborates, monopersulfates (e.g., Oxone, a registered trademark product of E. I. DuPont), perphosphates, superoxides, percarbonates and peracids such as peracetic acid. In addition, alkyl hydroperoxides, such as t-butyl hydroperoxide, have been found to be effective in the degradation process as an alternate oxidant. Other active oxygen specimens may also be used.

The hydrogen peroxide used in the process of this invention can be added to the starch slurry as a single shot or slowly over time as a number of portions, allowing time for its reaction with starch. After the addition of two or more such portions, the degree of starch conversion or degradation can be determined and additional hydrogen peroxide added as needed or the reaction can be terminated. In this slow addition procedure, the peroxide increments are reacted as they are added and better control of the degradation end-point can be achieved. A potassium iodide spot test can be used to confirm the presence or absence of hydrogen peroxide in the test slurry.

The process of oxidation hydrolysis using hydrogen peroxide is further described in U.S. Pat. No. 4,838,944 noted above, which patent is incorporated herein by reference along with U.S. Pat. No. 5,153,161 which discloses manganese complexes and which is also noted above.

The amount of hydrophobic modification of the corn starch can vary from about 0.5 to 6% by weight of bound ester substituent group based on the weight of starch, preferably from about 1.9 to 3.2% and more preferably from about 2.1 to 2.8%.

The modified starch of this invention is prepared for use as an adhesive by cooking and dispersing the starch in water at a solids of about 8 to 40%, preferably 18 to 30%. The starch may be cooked using any of the known techniques including atmospheric cooking and jet cooking or steam injection cooking. Typical cooking conditions can range from a temperature of at least the gelatinization temperature of the starch and this can be from about 55° to 200° C. or higher depending on the conditions and type of cooking being utilized. Preferred cooking is at about 190° to 195° C.

As stated previously, while the use of different starches and modified starches in adhesive formulations are known, the ability to provide a water resistant starch adhesive has generally required the addition of resins or crosslinking agents such as urea-formaldehyde to provide this function. The selected hydrophobic fluidity corn starch of this invention has been found to provide a water-resistant adhesive without requiring the use of a resin or crosslinking additive and further has resulted in a formulation which gives good viscosity stability. This combination of properties make this starch-based adhesive useful in a number of paper bonding applications including laminating adhesives, e.g., tissue/towel; tube winding; case and carton and particularly as bag adhesives, e.g., side seam, bottom paste and cross paste.

The viscosity of the adhesive compositions of this invention used in paper bonding applications can vary depending on the particular application but generally will vary between an initial viscosity of about 50 to 110,000 cPs Brookfield at 80° F. (26.6° C.), preferably between about 100 to 6000 cPs and more preferably between 750 to 3000 cPs. Viscosity stability describes the ability of an adhesive to maintain a workable consistency for an extended period of time, e.g., 24 hours (1 day) or 6/7 days in a given application. While this characteristic may vary depending on the particular application and conditions, for paper bonding applications and especially in bag adhesive applications, desired viscosity stability will be a percent viscosity change of less than 150% in 24 hours and preferably less than 100%. Over a longer period of 6 to 7 days, viscosity may increase to a higher degree and still be acceptable but generally a percent increase of less than 200% and preferably less than 150% over this period is a desired viscosity stability characteristic.

The starch-based adhesive composition of this invention has property characteristics which make it useful in different paper bonding applications including the use as a bag adhesive or in laminating. These different applications may involve the need for adhesive compositions with different properties. In the use as a bag adhesive, and especially in side seaming, the adhesive composition of this invention will desirably have an initial Brookfield viscosity of about 500 to 6000 cPs, preferably about 750 to 3000 cPs and a starch solids content of about 15 to 40%, preferably about 18 to 30%. Bag adhesives used in special applications such as bottom pastes may need higher initial viscosities of about 100,000 cPs (Brookfield) as found in the higher end of the previously noted viscosity range. On the other hand, laminating adhesives as used in tissue/towel applications will prefer lower initial viscosities of about 50 to 1000 and more preferably about 100 to 500 cPs (Brookfield) and starch solids of about 8 to 20%, preferably about 10 to 15%. In laminating adhesives, longer term viscosity stability is required, e.g., 60 to 90 days with typical viscosity changes of 10 to 50%.

The adhesive composition of this invention will generally comprise an aqueous formulation of the modified fluidity corn starch and water. While it does not require the use of crosslinking or resin additives to provide water resistance other additives commonly known and used in adhesives may be used providing they do not affect the water resistance and stability properties of the final product. Such additives may include, for example, tackifiers, defoamers, plasticizers, preservatives, bleaches, etc.

The following examples will further illustrate the embodiments of this invention. In these examples all parts are given by weight and all temperatures in degrees Celsius unless otherwise noted. The viscosity's were determined using a Brookfield viscometer at 80° F. (26.6° C.) unless otherwise noted. Reference to viscosity as used throughout the specification and examples is to this Brookfield viscosity.

EXAMPLE 1

A fluidity corn starch was prepared as follows. The corn starch base (100 parts) was slurried in water (125 parts) and heated to 40° to 43° C. in a controlled temperature bath. A 3% aqueous solution of sodium hydroxide (0.75 parts) was slowly added to the mixture followed by the addition of 0.0075 parts of a potassium permanganate as a 2% aqueous solution. The alkalinity of the mixture was adjusted to a pH of 11.7 to 11.8 (50 mL of reaction slurry should require 35 to 45 mLs of 0.1N HCl to neutralize to a phenolphthalein end point) and 2.5 parts of 30% aqueous hydrogen peroxide added slowly. The pH of the mixture was maintained at 11.7 to 11.8 and the reaction continued for 2 to 2.5 hours until it was nearly complete as indicated by a potassium iodide colorometric spot test run on a sample of the slurry mixture. The pH of the mixture was then adjusted to 6.0 with a dilute solution of hydrochloric acid. A sample of the prepared converted starch was analyzed to determine its water fluidity (WF) using a Stormer viscometer and found to have a WF of 75.

The converted corn starch was then modified by the addition of octenylsuccinic anhydride (OSA). The converted starch slurry was adjusted to a pH of 7.5 with 3% aqueous NaOH and octenylsuccinic anhydride (3 parts) was added in ⅓ increments every thirty minutes. The reaction was continued at 40° to 43° C. until the pH stabilized after 1 to 2 hours. The reacted slurry was removed from the temperature bath, filtered and dried.

The modified fluidity corn starch prepared as described above had a WF of 75 and a bound octenylsuccinic anhydride content of 2.55%. This starch product was formed into an adhesive composition by cooking in an aqueous solution of 22% solids at 195° F. for 15 minutes. The prepared adhesive was evaluated for water resistance when used as a paper bag adhesive in the following manner:

Water Resistance Test

1. Paste used immediately at 80° F.
2. Put 6 mil coating of paste on bag substrate
3. Mate with another substrate
4. Compress bond with roller (twice)
5. Place bonds between two glass plates
6. Place weight (25 lb.) on top of glass plates for 24 hours
7. Age bonds for one week
8. Water soak at room temperature
9. Pull bonds at 1, 4, 8 and 24 hours; evaluate fiber tear (FT).

The adhesive product was evaluated and had the following properties:

| Starch Material | WF | % Solids | Initial Visc. at 80° F. cPs | Visc. Change at ⅙ days | % Fiber Tear (FT) | | | |
|---|---|---|---|---|---|---|---|---|
| | | | | | 1 hr. | 4 hrs. | 8 hrs. | 24 hrs. |
| OSA modified corn starch | 75 | 22 | 1900 | 62/167% | 100% deep fiber tear | 100% deep fiber tear | 100% deep fiber tear | 100% fiber tear |

EXAMPLE 2

Additional samples of modified fluidity corn starch were prepared and formulated into adhesive compositions as in Example 1. These samples had varying amounts of modifying group (OSA) and also were converted or degraded using either hydrogen peroxide ($H_2O_2$) or acid conversion. The results are shown in the following table.

| Sample No. | Starch Material | WF | Type Conversion | % Solids | Viscosity cPs | % Viscosity Change | | | Water Resistance % Fiber Tear | | | |
|---|---|---|---|---|---|---|---|---|---|---|---|---|
| | | | | | | 1 day | 3 days | 6–7 days | 1 hr. | 4 hrs. | 8 hrs. | 24 hrs. |
| A | 2% OSA Corn | 71 | $H_2O_2$ | 21 | 6900 | 88 | 102 | 140 | 100 | 100 | 100 | 100 |
| B | 2% OSA Corn | 71 | Acid | 21 | 13000 | 84 | 107 | 320 | 100 | 100 | 100 | 100 |
| C | 3% OSA Corn | 71 | $H_2O_2$ | 21 | 5700 | 57 | 57 | 95 | 100 | 100 | 100 | 100 |
| D | 3% OSA Corn | 71 | Acid | 21 | 3300 | 172 | 200 | 250 | 100 | 100 | 100 | 100 |

| Sample No. | Starch Material | Type WF Conversion | % Solids | Viscosity cPs | % Viscosity Change | | | Water Resistance % Fiber Tear | | | |
|---|---|---|---|---|---|---|---|---|---|---|---|
| | | | | | 1 day | 3 days | 6–7 days | 1 hr. | 4 hrs. | 8 hrs. | 24 hrs. |
| E | 4% OSA Corn | 71 H$_2$O$_2$ | 21 | 4500 | 24 | 15 | 36 | 100 sh | 100 sh | 100 | 0 |
| F | 4% OSA Corn | 71 Acid | 21 | 18000 | 0 | 0 | 4 | 100 | 100 | 100 | 25 |

It is noted that while the acid converted starches of Samples B, D and F did provide comparable water resistance to the hydrogen peroxide samples, viscosity stability was generally not as good.

EXAMPLE 3

Additional test samples were run using pilot and plant test batches on modified fluidity corn starches prepared and formulated in a manner similar to Example 1. These samples identified below had varying starch or solids content and gave viscosity stability results as shown in the table.

| Starch Material | WF | Type Conversion | % Solids | Initial Viscosity cPs | % Viscosity Stability | | |
|---|---|---|---|---|---|---|---|
| | | | | | 1 day | 3 days | 7 days |
| Pilot Batch | | | | | | | |
| 3% OSA Corn | 75 | H$_2$O$_2$ | 18 | 650 | 30 | 37 | 51 |
| 3% OSA Corn | 75 | H$_2$O$_2$ | 20 | 980 | 36 | 48 | 48 |
| 3% OSA Corn | 75 | H$_2$O$_2$ | 22 | 940 | 39 | 39 | 40 |
| Plant Test Batch | | | | | | | |
| 3% OSA Corn | 72 | H$_2$O$_2$ | 18 | 850 | 88 | 68 | 96 |
| 3% OSA Corn | 72 | H$_2$O$_2$ | 20 | 1350 | 57 | 80 | 100 |
| 3% OSA Corn | 72 | H$_2$O$_2$ | 22 | 1980 | 71 | 88 | 100 |

All pilot batch samples gave water resistance of 100% fiber tear up to hours and all plant test samples gave 100% deep fiber tear up to 24 hours.

EXAMPLE 4

Additional modified corn fluidity starches were prepared as in Examples 1 and 2 using varying amounts (2.5, 4 and 6%) of dodecenylsuccinic anhydride as the modifying groups. These samples had a water fluidity (WF) of 75 and provided excellent water resistance properties of deep 100% fiber tear up to 24 hours. However, viscosity stability at 3 days was not good (200 to 400% change) in comparison to the OSA modified and H$_2$O$_2$ converted starch samples.

EXAMPLE 5

OSA modified starch samples of different base starches, namely tapioca, wheat and potato were prepared as in Examples 1 and 2. The modified tapioca and wheat starch samples gave both poor water resistance and poor viscosity while the modified potato starch gave fair water resistance and very poor viscosity properties.

EXAMPLE 6

A comparison of laminating adhesives for tissue-towel application was made using a 3% OSA modified corn starch as in Example 1, a 6% solids partially hydrolyzed polyvinyl alcohol and a 13% solids waxy starch in different test samples. All three samples were tested for one week viscosity stability, dry adhesion and water resistance. For the adhesion and water resistance testing, bonds were prepared and cured for 72 hours before testing. Dry adhesion was evaluated on the basis of hand feel and bond strength. The products were rated versus one another (from 1 to 3) for bond strength and hand feel. A rating of 1 is strongest bond or best hand feel and a rating of 3 is weakest bond or stiffest lamination. Water resistance was tested by placing a lamination in a beaker filled with water and then recording the length of time for complete delamination of the two plies. The results are shown in the table below.

| Property | Sample Material | | |
|---|---|---|---|
| | OSA Modified Corn | Partially Hydrolyzed Polyvinyl Alcohol | Waxy Starch |
| Initial viscosity cPs | 95 | 85 | 60 |
| Solids % | 13.8 | 6.6 | 13.4 |

-continued

| Property | Sample Material | | |
|---|---|---|---|
| | OSA Modified Corn | Partially Hydrolyzed Polyvinyl Alcohol | Waxy Starch |
| 24 hr. viscosity cPs | 130 | 95 | 65 |
| 72 hr. viscosity cPs | 128 | 94 | 62 |
| 1 week viscosity cPs | 150 | 100 | 70 |
| Δ viscosity % | +36.7 | +17.6 | +16.7 |
| Adhesion | Destructive bond - 1 | Good adhesion - 3 | Stronger bond - 2 |
| | Stiffer lamination - 3 | Good hand feel - 1 | Good hand feel - 1 |
| Water Resistance | 3.74 | 0.5 | 1.0 |
| minutes | 3.33 | 0.33 | 0.75 |

It can be observed that the OSA modified corn greatly improves the water resistance over the standard polyvinyl alcohol for towel laminations and the bond strength of a dry bond is vastly improved over both the other currently used products.

What is claimed is:

1. An aqueous water resistant, viscosity stable adhesive composition free of formaldehyde and other crosslinking additives and comprising a hydrophobically modified fluidity corn starch having the formula:

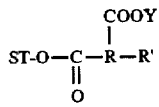

where ST is a fluidity corn starch having a water fluidity (WF) of from about 60 to 80; R is a dimethylene or trimethylene group; R' is a hydrocarbon group having 5 to 12 carbon atoms and Y is H, alkali metal, alkaline earth metal or ammonium; and wherein the composition has a solids content of 8 to 40%.

2. The composition of claim 1 wherein R' is a hydrocarbon group having 8 carbon atoms.

3. The composition of claim 2 wherein R is a dimethylene group.

4. The composition of claim 3 wherein the solids content is 18 to 30%.

5. The composition of claim 4 wherein the starch has a WF of from about 66 to 78.

6. The composition of claim 3 wherein the starch has about 0.5 to 6% of bound ester substituent group.

7. The composition of claim 6 having an initial Brookfield viscosity of about 50 to 110,000 cPs at 80° F.

8. The composition of claim 7 wherein the solids is about 18 to 30% and the starch has a WF of from about 66 to 78.

9. A paper bag adhesive composition comprising the composition of claim 3, having an initial Brookfield viscosity of about 500 to 6000 cPs at 80° F.

10. The paper bag adhesive composition of claim 9 wherein the corn starch is converted to said water fluidity using oxidative hydrolysis employing hydrogen peroxide and a catalytic amount of manganese ions.

11. The composition of claim 10 wherein the starch has about 0.5 to 6% of bound ester substituent group.

12. The composition of claim 11 wherein the solids is about 18 to 30% and the starch has a WF of from about 66 to 78.

13. The composition of claim 12 having an initial Brookfield viscosity of about 750 to 3000 cPs at 80° F.

14. The composition of claim 13 wherein the starch has about 1.9 to 3.2% of bound ester substituent group.

15. The composition of claim 1 wherein the corn starch is converted to said water fluidity using oxidative hydrolysis employing hydrogen peroxide and a catalytic amount of manganese ions.

16. The composition of claim 15 wherein the manganese catalyst is potassium permanganate.

17. The composition of claim 15 wherein R' is a hydrocarbon group having 8 carbon atoms.

18. The composition of claim 17 wherein R is a dimethylene group.

19. The composition of claim 15 wherein the solids content is about 18 to 30%.

20. The composition of claim 19 wherein the starch has a WF of from about 66 to 78.

21. The composition of claim 20 wherein R' is a hydrocarbon group of 8 carbon atoms and R is a dimethylene group.

22. The composition of claim 15 wherein the starch has about 0.5 to 6% of bound ester substituent group.

23. The composition of claim 22 having an initial Brookfield viscosity of about 50 to 110,000 cPs at 80° C.

24. The composition of claim 23 wherein R' is a hydrocarbon group having 8 carbon atoms, R is a dimethylene group, the composition has a solids content of about 18 to 30% and the starch has a WF of from about 66 to 78.

* * * * *